Patented Oct. 13, 1925.

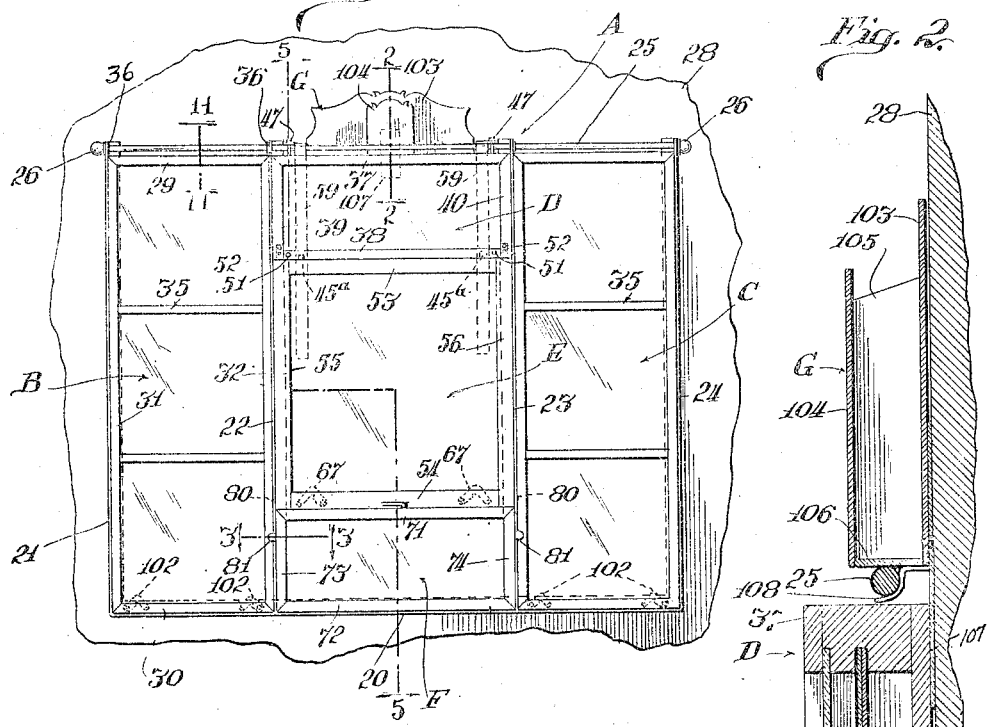

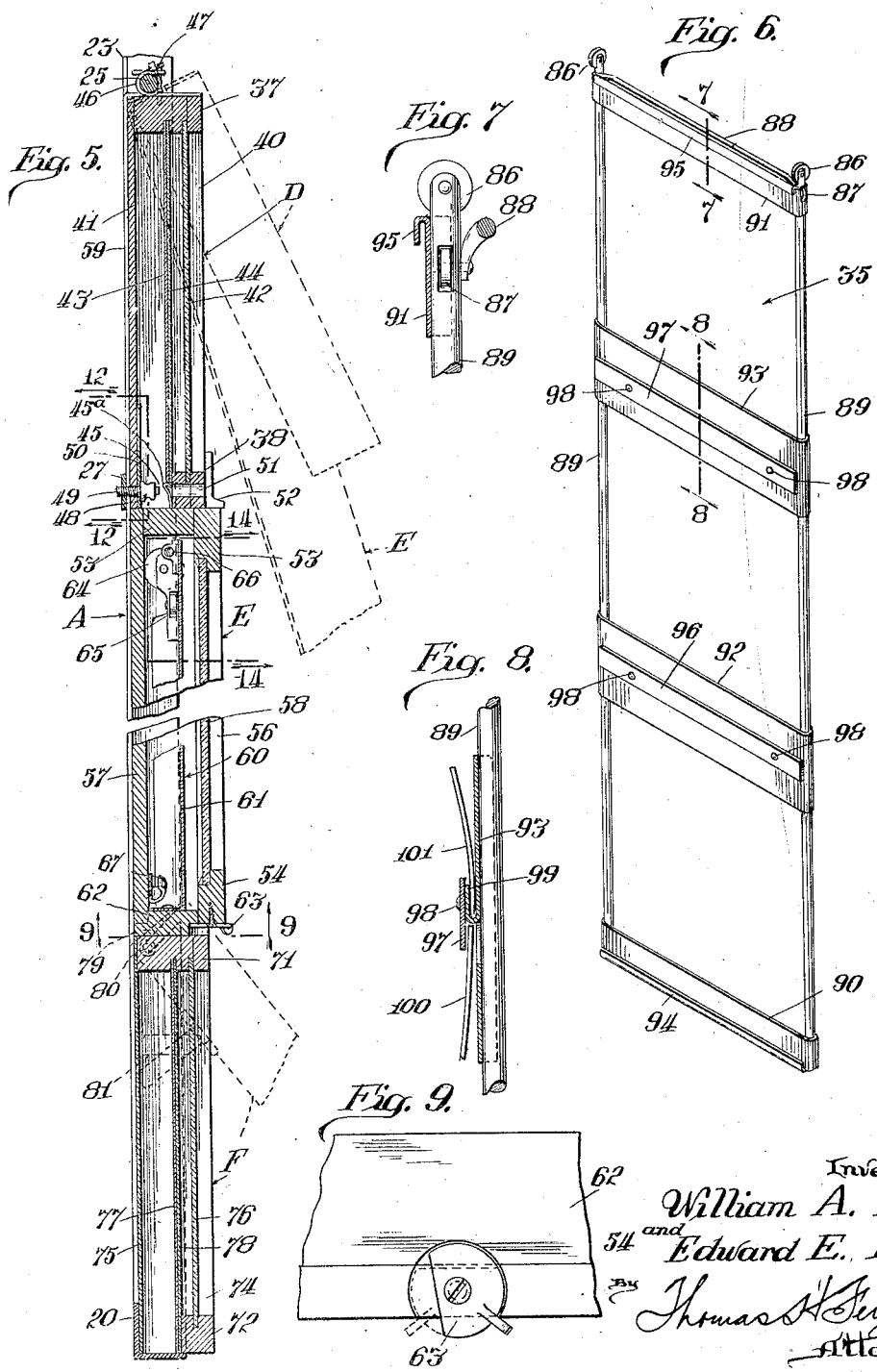

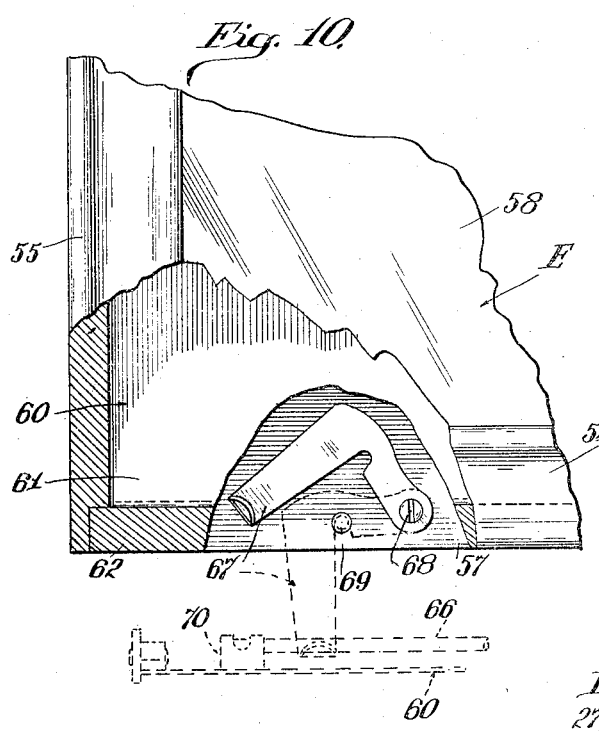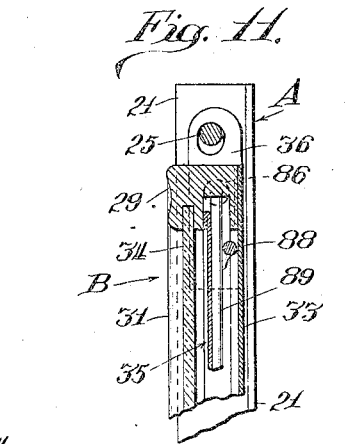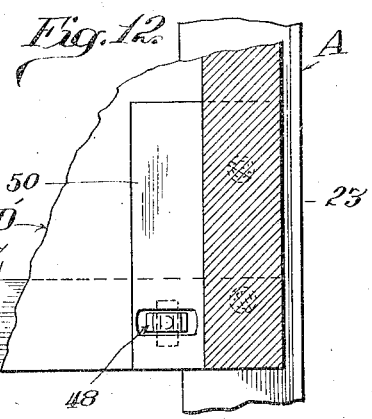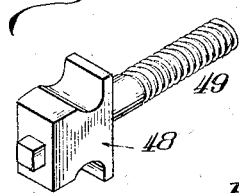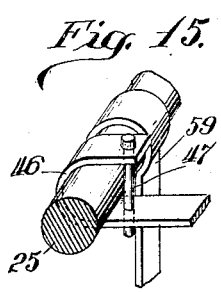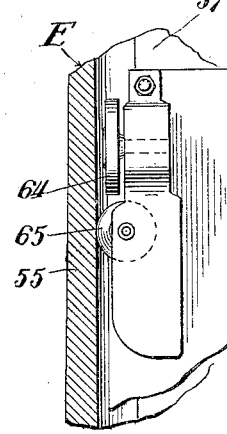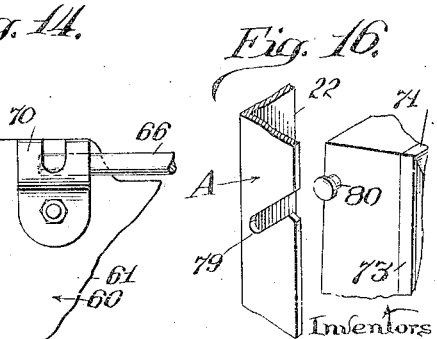

1,557,260

UNITED STATES PATENT OFFICE.

WILLIAM A. LEU AND EDWARD E. LEU, OF CHICAGO, ILLINOIS.

DISPLAY DEVICE.

Application filed February 18, 1924. Serial No. 693,447.

*To all whom it may concern:*

Be it known that we, WILLIAM A. LEU and EDWARD E. LEU, citizens of the United States of America, residing in the city of Chicago, county of Cook, and State of Illinois, have invented certain new and useful Improvements in Display Devices, of which the following is a specification.

The present invention relates to display devices of the class wherein a plurality of display panels are arranged in practically a common plane upon a main frame and disposed so as to hold advertising placards or sheets of paper or other material on which the advertisements are placed.

One object of the invention is to so arrange the panel frames upon the main frame that all of the former may be locked to the latter by merely locking a single panel frame. To this end the invention includes novel mountings for the different panel frames. Another object of the invention is to make the device waterproof. Another object is to locate the advertising sheets or cards upon trays which may be removed from and inserted into the waterproof panel frames with the greatest ease and convenience. To this end we provide special arrangements and connections for the tray. Another object is to produce a durable device which may be shipped to the display point in a knocked down condition and there readily put together and mounted without the exercise of special skill or knowledge.

The various objects and the ways in which we have attained them, together with the various features and advantages of the improvements, will be best understood upon reference to the following detailed description taken in connection with the accompanying drawing, and the scope of the invention will be particularly pointed out in the appended claims.

In said drawing, Fig. 1 is a front elevation of a display device constructed according to the present invention; Fig. 2 is a vertical section through the upper portion of the device illustrating a portion of the upper central panel frame and an attached pocket, the plane of section being indicated by the line 2—2 of Fig. 1; Fig. 3 is a transverse section illustrating in detail the construction of two adjacent panel frames and the relation of an interlocking member, the plane of section being indicated by the line 3—3 of Fig. 1; Fig. 4 is a perspective view of the locking member employed in the construction of Fig. 3; Fig. 5 is a vertical section through the upper, central and lower panel frames of the device, the plane of section being indicated by the line 5—5 of Fig. 1; Fig. 6 is a perspective view of a display card tray adapted for use in one of the lateral panel frames; Fig. 7 is a section showing in detail the construction of the parts at the upper end of said tray, the plane of section being indicated by the line 7—7 of Fig. 6; Fig. 8 is a similar section illustrating the way in which the cards are held upon the tray, the plane of section being indicated by the line 8—8 of Fig. 6; Fig. 9 is a detail illustrating in bottom plan portions of the central panel frame, the contained tray, and the button by which the tray is held in place within the frame; Fig. 10 is a partial sectional view of a portion of the central panel frame illustrating particularly the hooks by which the tray is supported when withdrawn from the panel frame; Fig. 11 is a vertical section of a portion of one of the lateral panel frames, its support and contained tray, the plane of section being indicated by the line 11—11 of Fig. 12 is a partial sectional view of the upper central panel frame and a portion of the adjacent main frame illustrating particularly the manner of locking the former to the latter, the plane of section being indicated by the line 12—12 of Fig. 5; Fig. 13 is a perspective view of the locking element; Fig. 14 is a view similar to Fig. 12 of the upper portion of the central panel frame and the enclosed tray illustrating details of construction, the plane of section being indicated by the line 14—14 of Fig. 5; Fig. 15 is a perspective view illustrating more particularly the hinge arrangement of the upper and intermediate central panels, and Fig. 16 is a perspective view of parts of the main frame and the lowermost panel frame showing in detail the connection of the latter to the former. Throughout these views like characters refer to like parts.

Referring to the drawing in detail, A designates the main frame upon which the various panel frames are located. These include the lateral panel frames B and C and the central panel frames D, E and F. G designates the attached pocket member. As will be shown, these panel frames are all pivotally mounted to the main frame at their upper edges and each panel frame is a waterproof container in which the matter to be displayed is located upon a suitable support, preferably a removable tray or like device.

The main frame is composed of angle bars firmly secured together. These bars include a horizontal bar 20 and spaced vertical bars 21, 22, 23 and 24. The outstanding webs of the vertical bars are perforated at their upper ends for the passage of a rod 25 which is provided at its ends with removable heads or nuts 26. A transverse bar 27 connects the vertical angle bars 22 and 23 at a point directly behind the lower edge of the upper panel frame D, as clearly illustrated in Fig. 5. This main frame, when supporting all the pivoted panel frames upon it, is secured in any suitable way to a support 28, which will ordinarily be the wall of a building. Of course it may be differently supported if the judgment of the user should so dictate.

The lateral panel frames B and C are identical in construction. It will, therefore, suffice to describe the panel frame B. This frame comprises end members 29 and 30, and side members 31 and 32, which are joined together to make a frame which closely fits between the outstanding webs of the angle bars 20, 21 and 22. As more particularly illustrated in Fig. 11, the frame thus produced is provided with a back 33, preferably of metal although it may be of other material. The frame members are grooved near their forward edges, as clearly shown, to receive a pane of glass 34 which extends throughout the length of the frame and with the back, sides and ends, forms an enclosed space for the tray 35 which, as will be hereinafter more fully explained, may be removed from the panel frame by withdrawing it through the open bottom of the latter when the frame member 30 has been moved forward out of engagement with the main frame member 20. The panel frame B is provided with apertured lugs 36 at its upper end, and these lugs are arranged so that the rod 25 passes through them. By this construction the frame B is pivoted upon the rod 25 and may be moved about said pivot so as to bring its members into compact relation with the oustanding webs of the angle bars of the main frame in what we may call the closed position, or moved outward from such position into what we may call the open position.

The upper central panel frame D is made up of an upper member 37, a lower member 38, and end pieces 39 and 40. These frame members are provided with a back 41 and are grooved near their forward edges for the reception of a pane of glass 42. In this instance, the outer members 37, 39 and 40 are also grooved just rearward of the glass for the reception of a plate 43 upon which the advertising matter 44 is located. With reference to this latter plate, however, the frame member 38 is cut away to provide an opening 45 through which the plate may be withdrawn from the panel frame when the latter is in open position, as indicated in dotted lines. Any suitable means may be employed for holding the plate 43 from dropping through the opening 45, such as the metal clips 45$^a$ which may be lightly sprung to free the plate for removal. The moving of the panel frame D from open to closed position is brought about by its hinged connection with the transverse supporting rod 25. As shown in Figs. 5 and 15, the frame D is provided with a pair of straps 46 which are secured to the upper frame member 37 and extend from beneath around the back of the rod 25 and then forward. Here a pin 47 may be passed through an opening in the end of the strap 46 in each instance into a suitable opening in that portion of the strap which engages the member 37. The pins 47 are removable so that the panel plate D, when rotated, may be readily withdrawn from the main frame. It will be noted that the frame D, when in closed position, snugly fits between the outstanding webs of the angle bars 22 and 23 and rests against the coplaner webs of the same bars.

In order to lock the panel frame D in closed position against the main frame A, we provide two locking elements like the one illustrated in Fig. 13. This element comprises a head or button 48 and a threaded shank 49. The latter, in each instance, passes through a threaded opening in the flat bar 27 which joins the vertical frame bars 22 and 23. The back 41 of the panel frame D is provided on its inner face with wear plates 50. These plates and the adjacent portions of the back 41 are provided with oblong openings through which the heads 48 of the locking elements are adapted to pass when those elements are in one position, but through which they will not pass when the locking elements are turned at right angles from that position, as indicated in dotted lines in Fig. 12. By this construction it is possible, therefore, to set the heads 48 so that they will pass through the openings in the plates 50 and then to move the panel frame D into its closed position. When in this position, the heads 48 may then be turned through ninety degrees and the panel frame D will be locked. In order to have access to the heads 48 of the locking elements, we provide suitable openings 51 in the member 38 through which a key may be passed to turn the heads 48 into the desired positions. At this point it may also be noted that we provide two members 52 which are located at the ends of the panel member D in position to bear against the upper frame member of the intermediate panel frame E. These members 52 increase the bearing face between the frames D and E and, as we shall see, thereby serve to lock the latter more firmly in closed position when the upper frame D is in closed position.

The intermediate panel frame E is made up by joining together the upper member 53, the lower member 54, and the side members 55 and 56. In this instance the upper member 53 is adapted to fit snugly against the under side of the upper frame D and the side members 55 and 56 against outstanding webs of the main frame members 22 and 23. These peripheral members 53, 54, 55 and 56 are united to a back 57, and the forward portion of the frame is grooved for the reception of a pane of glass 58, somewhat the same as in the case of the previously described panel frames. As shown more particularly in Fig. 5, the peripheral members are made up of two parts each, but this is a detail which may be varied as desired. The panel frame E is supported by two straps 59 which extend upward behind the upper frame D and are there bent outward, upward and backward about the main frame rod 25. With this construction it will be seen that the straps 59 securely support the frame E from the rod 25, and the construction is such that the frame E cannot be removed from the rod unless the frame D has been previously removed therefrom. However, when frame D has been removed from the main frame, frame E may be readily removed therefrom also. These removable features are of importance in the manufacture, shipping and assembly of the device. They contribute to the shipping of the device in a knocked down condition and its ready assembly at the point where it is to be used.

The frame E forms an enclosed casing for a tray 60 upon which the material to be displayed within that frame is located. This tray consists principally of a sheet of metal 61 which is secured at its lower edge to a transverse strip 62 which closes the opening at the lower edge of the frame E. A button 63 is pivoted to the lower edge of the frame member 54 and is adapted to be swung into position to engage the member 62 and hold the tray within the frame E when the latter is moved to its outward or open position. When it is desired to remove the tray 60 from the frame E, then it is only necessary to rotate the button 63 to the dotted line position illustrated in Fig. 9, whereupon the tray may be readily withdrawn. To enable the tray 60 to be readily moved to and fro within the frame E, it is provided at its upper end with anti-friction wheels 64 which are adapted to bear against the back 57 as the tray is moved into and out of the frame E. This movement is further facilitated by other anti-friction wheels 65 which bear against the side members of the frame E. Furthermore, the tray is adapted to be supported, when drawn downward and out of the frame E, by means of the co-operation of a rod 66 at the upper end of the tray, with hooks 67 at the lower end of the frame. These hooks are angular in shape, and each is secured by a pivot screw 68 to the back 57 and is adapted to be moved against a stop 69 upon the same back. The hooks are in the full line position of Fig. 10 when the tray is held up in place within the frame E. However, as soon as the frame E is moved outward and the tray 60 is drawn downward to the point where it is about to pass from the frame E, the rod 66 carried in the brackets 70 upon the upper end of the tray engages the hooks 67 and draws the same into the dotted line position of Fig. 10. The tray is thus suspended from the lower end of the panel frame E in position so that the display matter upon it may be readily changed or otherwise altered. After the tray 60 has had its display matter put in proper condition, it may be readily pushed back into the space within the frame E and the button 63 thrown to maintain the same closed. The strip 62 in its inward movement engages the hooks 67 and rocks them to the full line position illustrated in Fig. 10.

The lowermost central panel frame F comprises the upper frame member 71, the lower frame member 72, and the side frame members 73 and 74. These, as in the case of the previous panel frames, are provided with a back 75 and a pane of glass 76, the latter being located just forward of the plate 77 which bears the display matter 78 on its face. This panel frame fits snugly between the outwardly extending webs of the frame members 20, 22 and 23 and the under face of the intermediate panel frame E. In this instance the outstanding webs of the main frame members 22 and 23 are provided with inclined slots 79. Pins 80 project from the side members 73 and 74, pass through these slots and thus provide a support for the panel frame F. Because of the inclination of the slots 79, the frame F cannot be removed from the main frame so long as the intermediate frame E is in closed position. The truth of this will be clear from an inspection of Fig. 5 wherein the panel frames are shown in their closed positions in full lines and in open position in dotted lines. The frame F is provided with two locking members 81, each of which comprises a leaf 82 and an extension 83 provided with a turned end 84. The leaf 82 in each instance is secured to the rear of a side frame member 73 or 74, as the case may be, and the extension 83 is adapted to lie in a recess 85 in the side member, 73 or 74, adjacent to the forwardly extending web of the near-by angle bar, 22 or 23. The turned end 84 in the one case is adapted to extend outwardly over the member 32 of the lateral panel B. In the other case the end 84 extends outwardly over the corresponding member of the panel frame C. The relation of the parts is clearly shown in Fig. 3 where the frame F locks the frame B in closed position upon the main frame A. When the frame F is moved to the open position, then the member 81 is moved away from the panel frame B, and the latter may be rocked forwardly about its pivotal support upon the rod 25. The members 81 may also be used as props or supports, as clearly illustrated in Fig. 5, to hold the frame F in its open position.

With this construction, it will be seen that locking frame D to the main frame locks all the other frames thereto, frame D locking frame E, frame E locking frame F, and frame F locking frames B and C.

The lateral panel frames B and C have trays 35 which are very similar in their construction to the tray 60 of the central panel frame E. The trays 35 in each instance are provided with anti-friction wheels 86 and 87 at their upper ends, and with a transverse rod 88. The wheels 86 and 87 operate in the same manner as the wheels 64 and 65, to reduce friction and to facilitate the insertion and withdrawal of the tray. In the case of the tray 35, we employ two upright rods 89 and connect the same at the bottom by a transverse strip of metal 90, at the upper end by a similar strip 91, and at intermediate points by strips 92 and 93. Strip 90 has its lower edge flanged at 94 to provide a groove for the reception of an advertising card or like display material. The strip 91 is similarly provided with a flange 95 for the same purpose. Flanges on the intermediate members 92 and 93 are provided by additional strips 96 and 97 secured by rivets 98 or other suitable means to turned up portions 99 struck up out of the associated main strip. In Fig. 8 portions of advertising cards 100 and 101 are shown in position behind the strip 96. As before noted, the tray 35 is held within the lateral panel frame by the outstanding flange of the lower member 20 of the main frame A. In this instance hooks 102, similar to the hooks 67, are provided. These hooks cooperate with the rods 88 upon the upper ends of the trays 35 and hold them suspended while changes of the advertising or other display matter are being made.

When the main frame and the various panel frames mounted thereon are in use upon a wall 28 or other like support, the pocket structure G may be employed. This pocket structure includes a back 103, a front 104, ends 105 and a bottom 106. The back 103 may be variously shaped so as to produce an ornamental effect. It is provided with a downwardly projecting member 107 in the form of a strip which is secured at its upper end to the back and is adapted to pass down between the frame D and the wall 28. A curved tongue or hook 108 is secured to the pocket structure G and passes around a portion of the transverse rod 25. With this arrangement of the strap 107 and tongue 108, the pocket structure G is firmly held in place against the wall and above the main frame and its suspended panel frames. Whenever the main frame is removed from the wall, the pocket structure may be readily removed also. The pocket provided by this structure may be used to hold folders or other matter which it is desired to distribute. As shown, the upper edge of the front 104 of the pocket is also artistically shaped so as to add to the attractiveness of the structure.

It will be apparent that in carrying out our invention certain minor changes may be made in the structure herein disclosed without departing from the spirit and scope of our invention. We, therefore, seek to cover by the terms of the appended claims all such changes as rightly come within its scope.

What we claim and desire to secure by Letters Patent is:

1. A display device comprising a main frame, two outer panel frames pivoted at their tops to said main frame, a series of central pivoted panel frames, the uppermost central panel frame being pivoted at its upper edge to said main frame, means for locking the lower portion of said uppermost central panel frame to said main frame, a mounting for the second central panel frame upon said main frame underlying said uppermost central panel frame whereby the locking of the latter to the main frame holds the former against movement outward from said main frame, a mounting for the third central panel frame upon said main frame whereby said third frame is locked by said second frame, and locking means on said third central panel frame for holding said outer panel frames against movement from said main frame when said third panel frame is in locked position against said main frame.

2. A display device comprising a main frame, a first panel frame pivoted at its upper edge to said main frame, means for locking said first panel frame at its lower edge to said main frame, a second panel frame beneath said first frame mounted so as to be held closed against the main frame when said first frame is locked as aforesaid, and a third panel frame beneath said second frame mounted so as to be held closed against the main frame when said second frame is held closed thereagainst by said locked first frame.

3. A display device having a main frame.

a rod extending along the upper edge of said main frame, a panel frame adapted to rest against said main frame, hinge straps secured to said panel frame and extending partly around said rod whereby said panel frame may be rotated about said rod and when rotated to a certain point may be detached therefrom, another panel frame adapted to rest against said main frame directly beneath said upper frame, hinge straps secured to said other frame and extending upward behind said upper frame and partly around said rod but in a direction opposite to that of said first mentioned hinge straps, and means for locking the lower edge of said upper frame to said main frame to thereby firmly hold said other frame against said main frame.

4. A display device having a main frame, a panel frame pivoted at its upper edge to said main frame and movable at its lower edge away from said main frame and another panel frame having at its upper edge a pin and slot connection with said main frame, the said connection having its slot so positioned that said other panel frame may be detached from said main frame but only when said first mentioned panel frame is swung away at its lower edge from said main frame.

5. A display device comprising a main frame, a first panel frame pivoted at its upper edge to said main frame and movable at its lower edge outward away from said main frame, a second panel frame pivoted at its upper edge to said main frame and located with one side close to one side of said first panel frame, and a pivoted member secured to said second panel frame at its side adjacent to said first panel frame and serving in one position as a prop to hold said first member with its bottom edge away from said main frame and serving in another position to overlap the adjacent edge of said second panel member to hold the latter against said main frame when the former is against said main frame.

6. A display device having a panel frame pivotally supported at its upper edge and fully enclosed at all points except its lower edge, the front being transparent, a tray slidable into and out of the enclosing panel frame by inserting and withdrawing the same through the opening at the lower edge of said frame, a transverse rod at the upper end of the tray, and hooks at the opening in the lower edge of said frame for engaging said rod to hold the tray when the latter is drawn out of said enclosing frame.

7. A display device having a panel frame pivotally supported at its upper edge and fully enclosed at all points except at its lower edge, the front being transparent, a tray slidable into and out of the enclosing panel frame by inserting and withdrawing the same through the opening at the lower edge of said frame, a transverse rod at the upper end of the tray, angular hooks pivoted to the lower end of the frame at the opening therein and movable about said pivots in a plane parallel to the plane of the tray into and out of the space within said frame, and stops for holding said hooks in their extended position ready to engage said rod to hold said tray when the latter is drawn out of said enclosing frame.

Signed at Chicago, Illinois, this 15th day of February, 1924.

WM. A. LEU.
EDWARD E. LEU.